(12) United States Patent
Fournier

(10) Patent No.: US 11,278,002 B2
(45) Date of Patent: Mar. 22, 2022

(54) GUIDE STRUCTURE FOR STALLING ANIMALS SUCH AS CATTLE

(71) Applicant: Nicolas Fournier, Esnoms Au Val (FR)

(72) Inventor: Nicolas Fournier, Esnoms Au Val (FR)

( * ) Notice: Subject to any disclaimer, the term of this patent is extended or adjusted under 35 U.S.C. 154(b) by 302 days.

(21) Appl. No.: 16/483,931

(22) PCT Filed: Jan. 31, 2018

(86) PCT No.: PCT/FR2018/050234
§ 371 (c)(1),
(2) Date: Aug. 6, 2019

(87) PCT Pub. No.: WO2018/146398
PCT Pub. Date: Aug. 16, 2018

(65) Prior Publication Data
US 2019/0387707 A1  Dec. 26, 2019

(30) Foreign Application Priority Data
Feb. 7, 2017  (GA) ..................... 17 51010

(51) Int. Cl.
*A01K 1/06* (2006.01)
*A01K 15/02* (2006.01)
*A01K 1/062* (2006.01)
*A01K 1/00* (2006.01)

(52) U.S. Cl.
CPC .............. *A01K 1/0613* (2013.01); *A01K 1/06* (2013.01); *A01K 1/062* (2013.01); *A01K 15/028* (2013.01); *A01K 1/0005* (2013.01)

(58) Field of Classification Search
CPC ........ A01K 1/0613; A01K 1/062; A01K 1/06; A01K 15/028
See application file for complete search history.

(56) References Cited

U.S. PATENT DOCUMENTS

| 75,595 | A | * | 3/1868 | Stone | A01K 15/028 119/517 |
| 1,013,447 | A | * | 1/1912 | Root | A01K 15/028 119/517 |
| 1,197,194 | A | | 9/1916 | Ferris | |
| 1,235,483 | A | * | 7/1917 | Johnston | A01K 1/0613 119/729 |

(Continued)

FOREIGN PATENT DOCUMENTS

DE  1184545 B  * 12/1964  .......... A01K 1/0606
DE  1482345 A1  4/1969

(Continued)

OTHER PUBLICATIONS

International Search Report with English translation and Written Opinion with machine-generated translation dated May 15, 2018 in corresponding International Application No. PCT/FR2018/050234; 18 pages.

*Primary Examiner* — Jessica B Wong
(74) *Attorney, Agent, or Firm* — Maier & Maier, PLLC

(57) ABSTRACT

A front element for stalling an animal in a free stall, that is better suited than earlier devices to the morphology and movements of the animal to be contained, helping guide the animal when it is positioning itself, standing up and/or lying down in its free stall. Such a front element can be implemented in a pair in a front structure, in order to delimit the internal space I of said free stall.

9 Claims, 2 Drawing Sheets

(56) References Cited

U.S. PATENT DOCUMENTS

| | | | | |
|---|---|---|---|---|
| 2,578,093 | A | * 12/1951 | Schillinger | ............ A01K 1/06 |
| | | | | 119/745 |
| 2,648,308 | A | 8/1953 | Ogden | |
| 2,815,735 | A | * 12/1957 | Collier | .................... A01K 1/06 |
| | | | | 119/747 |
| 3,023,734 | A | * 3/1962 | Schaub | ................ A01K 1/0613 |
| | | | | 119/729 |
| 3,413,959 | A | 12/1968 | Torsten et al. | |
| 4,782,791 | A | * 11/1988 | Brock | .................. A01K 1/0613 |
| | | | | 119/732 |
| 5,285,746 | A | * 2/1994 | Moreau | .................... A01K 1/12 |
| | | | | 119/14.03 |
| 5,441,016 | A | * 8/1995 | Ricketts | ............... A01K 1/0613 |
| | | | | 119/723 |
| 5,727,504 | A | * 3/1998 | Koster | .................... A01K 1/12 |
| | | | | 119/520 |
| 6,199,514 | B1 | * 3/2001 | Jubinville | ............ A01K 1/0613 |
| | | | | 119/728 |
| 7,007,632 | B1 | 3/2006 | Vrieze | |
| 2007/0017455 | A1 | * 1/2007 | De Vor | .................. A01L 13/00 |
| | | | | 119/737 |

FOREIGN PATENT DOCUMENTS

| | | | |
|---|---|---|---|
| DE | 7724959 U1 | 1/1978 | |
| DE | 202009004716 U1 | 6/2009 | |
| FR | 2303469 A1 | 10/1976 | |
| GB | 1512112 A | 5/1978 | |
| SE | 111 296 C1 | 7/1944 | |
| WO | 2008103038 A1 | 8/2008 | |
| WO | 2017/037390 A1 | 3/2017 | |
| WO | WO-2017037390 A1 * | 3/2017 | ............ A01K 1/0011 |

\* cited by examiner

GUIDE STRUCTURE FOR STALLING ANIMALS SUCH AS CATTLE

FIELD

The present invention relates to the general field of agricultural operations and more precisely the field of stalls intended to serve as sleeping space for an animal, for example a bovine, in free or hobbled stalling.

The invention relates more particularly to a device enabling animals to stand up and/or lie down more easily.

BACKGROUND

Current stalls, which have a high presence in operations, comprise various elements well known to persons skilled in the art, such as the withers bar, the restraint, the stall separator, and the horizontal front bars. The functions and uses for which stalls are intended must not be confused in comparison with headgates, to which the present invention does not relate.

The majority of elements of stalls are arranged fixedly. They therefore give rise to a hindrance or even trauma in animals when they move.

The restraint, the function of which is to limit the forward travel of the animal in the supine position, is an element that frequently causes injuries (grazes, ulcers, etc.) at the knees and/or hams of the animals.

In the case of the front bar or withers bar, the function of which is to limit the forward travel of the animal in the standing position, it is easy to note a faulty adjustment of the stalls. The loss of hair or swelling at the neck occur when the bar is wrongly adjusted for height, while lameness and/or a "perch" position of the animal occur when the bar is set too close the threshold of the stall.

In the converse case, when the animal can raise itself easily, it will have a tendency to stand more deeply in its stall, which means that it defecates more therein, increasing risks of infections and the time necessary for maintenance.

Finally, the withers bar and the restraint are very often positioned in the same vertical plane, which is not a very ergonomic configuration.

It will be recalled that a bovine lies down and stands up on average 16 times a day and that the average duration lying down has an influence on the productivity of the animal (milk/meat) and its health (veterinary costs, improvement in the fitness level).

Finally, the anatomy of a bovine is such that its shoulder moves firstly on a rising diagonal during the standing-up sequence and secondly on a vertical axis during the lying-down sequence. Optimisation of the front elements according to the particular anatomy is therefore a real challenge, in order to guarantee for the animal firstly guidance of its movements, secondly increased freedom for its position, and finally a cleaner living space.

Certain alternatives exist, usually aimed at restricting the animal while leaving limited freedom of movement in a lying-down position and a standing position. To this end, the systems proposed frequently have pivoting elements. The structures proposed in the documents U.S. Pat. Nos. 3,413,959 and 1,197,194 are for example known.

In the document U.S. Pat. No. 3,413,959 presents an arrangement consisting of vertical uprights in the form of an inverted double U, broadened at the shoulders of the animal, and a bottom transverse bar intended to hamper the animal once it has passed its head under said uprights, while the document U.S. Pat. No. 1,197,194 relates to an installation in which provision is made for adjusting by pivoting an element forming an inverted U, hinged between the ground and a horizontal support element.

In the same spirit, the document U.S. Pat. No. 2,648,308 is also known, which describes an inclinable barrier comprising a multiplicity of supporting yokes having divergent arms forming an inverted V and provided with a chain aimed at blocking the forward movement of the animal at the bottom part, the position of the top of said yoke being adjustable in the direction transverse to the plane of said V-shaped arms.

These constructions nevertheless remain unergonomic for the animals, cannot be adjusted according to each other and must be manipulated manually by a human.

Other systems have attempted to overcome these drawbacks, by proposing pivoting constructions aimed at completely eclipsing the front part of the structure when the animal is lying down, and conversely to present the structure facing the animal in the standing position, in particular during feeding periods. Such a design is disclosed in the document DE 20 2009 004716, wherein the mechanised structure makes it possible to constrict the animal in the standing position level with the head, and provision is made for forcing the animal to lie down under the structure when the latter is raised. Another system for disturbing the animal to the minimum is proposed in the document WO 2008/103038, wherein a structure in the form a pivoting kneeling pad, on which the animal stretches out, is proposed.

Equipment is known such as that described in the French patent application FR 2 303 469 or again the German utility model DE 77 24 959.

Nevertheless, all these devices may cause injuries to the animals, located at the head in the first case (risk of injuries by jamming of the horns), or located at the knees and hands (due to friction) in the second case.

SUMMARY

The present invention thus aims to propose front elements better suited to the animals, whether they are used alone or within a global front structure, in order to form the front part of a stall.

Developing an ergonomic stall is based on a complete understanding of sequences of movements of the animal that it is sought to guide. When the animal is installed in its stall, it performs a particular series of movements in the case of getting up (or lying down). The animal stretches its head forwards and downwards (movement M1) in order to lift its hindquarters, and then takes a step of approximately 45 cm in front of the shoulder with a first anterior limb on which will support itself, while making a retraction movement (movement M2) both backwards and upwards, in order finally to unfold the second anterior limb and to rise up completely in a vertical movement (movement M3).

Thus, in order not to interfere with the animal in its movements, the global geometry of the front element (or of the front structure) must follow this sequence of movements.

In this regard, there is proposed, in accordance with the invention, a stall consisting of an "interior space" I in which the animal can move. It is formed by various blocking elements, including:

One (or more) top-façade element or elements, such as one or more front elements or a front structure, at the front of said stall, One (or more) bottom-façade elements, such as a restraint on the ground (also referred to as a kneeling pad) and/or at least one anti-crawl element (also referred to as a pectoral restraint), at the front of said stall, One (or more) lateral elements, such as one or more stall separators, on the sides of said stall.

The top-façade element according to the invention is designed so that the shoulders of the animal, whatever its position, cannot pass a vertical plane $P_1$ taken as a reference symbolically representing (the plane $P_1$ not being physical) the front of said stall (also hereinafter referred to as the "front plane").

Preferentially, the top-façade element according to the invention is designed so that the shoulders of the animal, when it is lying down, cannot pass said vertical plane $P_1$.

"External space" E refers to the space situated beyond the stall, at the front of the animal. Thus the vertical plane $P_1$ delimits the internal space I with respect to the external space E at the front of the stall.

The terms "left" and "right" correspond to the view from the outside of the stall, when the animal is seen face on, when it is in a conventional position in its stall.

Thus the present invention rethinks the position of the animal in its stall no longer solely in relation to the "height at the withers" parameter, but in relation to the parameters "width of the animal", "height at the shoulder in the lying position" and "hoof-shoulder-tip height" (height to the shoulder in the standing position).

The solution proposed is based on a minimalist arrangement, of the "collar" type (in the case of a stall comprising two front elements), which:

serves as a guide for the animal when the latter is lying down or is getting up, and prevents the animal from creeping towards the front of said stall (that is to say towards the external space E), where the food is usually situated, since its shoulders cannot go beyond the front plane $P_1$.

Thus the front element, for stalling an animal such as a bovine in a stall the front limit of which is represented symbolically by a vertical plane $P_1$ comprising a vertical axis B of symmetry of said stall and serving as a boundary between an internal space I and an external space E, said front element comprising at least one means of restraining the animal:

off the ground, comprising at least: a top rim, an inner rim able to passively guide the movements of the animal when getting up or lying down, able to hinder at any time the forward movement of said animal towards the external space E, by forcing the animal at all times to keep its shoulders in the internal space I, and in that it is able to receive the head of the animal above said top rim of said restraining means when the animal is standing, said front element being remarkable in that it comprises at least one means for setting its dimensions for the purpose of being adjustable throughout the process of growth of the animal and in that the means of restraining the animal is oriented along a plane $P_2$ inclined by an acute angle α in relation to the plane $P_1$ so that the bottom half-plane $P_2$ is directed towards the external space E, the intersection between said plane $P_1$ and said plane $P_2$ defining a horizontal axis A.

Advantageously, the front element makes it possible to hinder at all times the forward movement of said animal towards said external space E.

Once installed, said means of restraining the animal is preferentially fixed overall, that is to say the minimum geometric reference frame defined previously (plane $P_1$, plane $P_2$, axis A, axis B).

Said means of restraining the animal is also a means for guiding the neck of the animal during its getting-up and lying-down movements. It may also be considered to be a means of correcting the posture and behaviour of the animal.

The use of said restraining means in a stall makes it possible to channel the movements of the head of the animal, and more specifically the movements of its neck, by encouraging it to adopt a correct posture and behaviour in the stall.

It is a case of "passive" guidance, that is to say the restraining means does not need to move or be moved significantly (for example via the complete tilting of the structure, which constitutes an active encouragement through the movement and/or through active encouragement through a noise or any other stimulus) in order to encourage the animal to pass from the standing position to the lying-down position and vice-versa. The encouragement is passive.

Nevertheless, the restraining means may comprise deformable means aimed at making it flexible such as flexible materials, articulations, springs, etc., and therefore very slightly movable in order to facilitate its interaction with the animal, and/or to be able to adapt following any mechanical force caused by the animal, and/or to attenuate any mechanical force caused by the animal, and to limit the risks of injury. It will be understood clearly that such variants of said restraining means remain overall in their position provided in the minimum geometric reference frame defined (plane $P_1$, plane $P_2$, axis A, axis B), or in any extended reference frame provided for in this text and including said minimum reference frame, even if they optionally undergo minor and transient deformations.

"Off the ground" means the fact that the animal can freely pass its limbs below said restraining means without encountering any obstacle and/or the fact that there is no direct anchoring point between said restraining means and the ground.

Preferentially, the inner rim of said means of restraining the animal has a shape suited to the neck size of the animal.

Advantageously, said inner rim is fully facing the neck of the animal solely during getting-up and lying-down movements thereof.

"Fully" means the fact that, when looking at the animal from the side, the diameter of its neck appears smaller than the apparent dimension of said inner rim (cf. FIG. 3, animal in the process of getting up and/or lying down shown in heavy lines).

When the animal is standing up or lying down, it may happen that the inner rim of the restraining means is partially facing the neck of the animal. This situation may arise with animals that are larger or smaller than normal (relatively to their species), which is an infrequent case in current herds.

Preferentially, said top rim and said inner rim are contiguous and/or form one and the same rim.

Preferentially, said restraining means is roughly rectangular.

Advantageously, said front element comprises at least one anchoring means connected to said restraining means, and intended to allow the fixing of said front element to an external element (also referred to as a carrying element) such as the ground, a wall, a ceiling, a suspension chain, a post, a bar, a stall separator, etc.

Advantageously, said anchoring means enables a stall to be constructed quickly.

Said anchoring means may for example be a bar, a collar, a ring, a stud, a perforated flange, etc.

Advantageously, the front element is suitable and intended for receiving the head of the animal above said top rim of said restraining means when the animal is standing. It is understood by this that the positioning by the animal of its head above said top rim of said restraining means is recurrent and desired, that is to say it is not an undesirable movement resulting from an "error" in positioning resulting from the animal.

Advantageously, the animal can position its head at least above said restraining means, whether it be standing or lying down.

Nevertheless, the angle α is preferentially chosen so as to encourage the animal to position its head level with or below said restraining means when it is lying down.

Preferentially, the angle α is between 50° and 75°. Even more preferentially, the angle α is equal to 60°. Advantageously, according to a preferred variant, the front element is tubular, for example designed from metal tubes or from more flexible tubes. A person skilled in the art knows how to choose the appropriate material according to the age and type of animal to be restrained.

In these tubular variants, the front element further preferentially comprises at least one safety bar that prevents the animal wedging its head in said front element.

Advantageously, according to certain variants of the invention, the front element comprises at least one means for adjusting the dimensions thereof (such as a telescopic tube system), for example for the purpose of being adjustable throughout the process of growth of the animal.

According to the invention, "connecting element" means an element for connecting a plurality of front elements together, preferentially through their highest point or points, such as a horizontal bar, an element in the form of an inverted U, triangular, rounded, a frame or a chain.

Thus a front element according to the invention can be used in a front structure characterised in that it comprises at least two front elements, having a minimum horizontal separation D, said separation being both greater than the neck size and less than the breadth of the animal, said front elements being disposed in a relationship of chiral symmetry in relation to:
- a vertical plane $P_3$ parallel to the plane $P_1$ passing through the centre of said restraining means, and
- a vertical axis C belonging simultaneously to the plane $P_3$ and to the plane perpendicular to the plane $P_1$ that contains the axis B.

Thus the front structure can be described with reference to the minimum geometric reference frame defined (plane $P_1$, plane $P_2$, axis A, axis B) and/or to the extended geometric reference frame defined above (plane $P_1$, plane $P_2$, plane $P_3$, axis A, axis B, axis C).

Advantageously, according to certain variants, the front elements used in said front structure are associated with each other through at least one connecting element.

Advantageously, according to certain variants, said front structure comprises at least one fixing means intended to fix it to a carrier element.

Advantageously, in order to make possible the adjustment of the minimum horizontal separation D, the connecting element comprises at least one means for setting (adjusting) its dimensions.

Advantageously, the minimum horizontal separation D will take a value between 20 and 30 cm. Preferentially, the minimum horizontal distance D is 30 cm.

Advantageously, said connecting element comprises at least one fixing means for being able to be fixed to at least one carrying element.

In normal use, the animal advances in its stall provided with at least one front element or a front structure. This has been put in place at a height such that the head of the animal passes at least above the top rims of the restraining means, and optionally under the connecting element in the variants where such exist. The head of the animal is then situated in the external space. The minimum horizontal separation D between the two front elements is such that the animal cannot advance further than level with its shoulders. The animal is then free to sway its head and to make movements of lowering and raising of its body in order to stand up and/or lie down, while being guided by the front element or the structure, which, according to the variant chosen, may further be adjustable and/or provided with damping elements.

It will be understood clearly that, in its minimalist variant, a stall comprises at least one top façade element and at least one lateral blocking element.

It is possible for example to envisage a stall delimited by a wall that serves as a lateral element and by a single front element associated with a stall separator on the other side.

The improved variants of a stall, whatever the variant chosen for the top façade element or elements, also comprise at least one bottom façade element, which supplements the base assembly presented previously and constitutes at least one top façade element associated with at least one lateral blocking element.

Advantageously, the bottom façade element is disposed in the plane $P_1$.

Preferentially, the bottom façade element is disposed under the restraining means.

Even more preferentially, the bottom façade element is disposed under the restraining means, in a plane parallel to the plane $P_1$.

In an entirely preferred variant, the bottom façade element is disposed under the restraining means, in a plane $P_3$ parallel to the plane $P_1$ passing through the centre of said restraining means.

Thus, according to a variant of the invention, the bottom façade element is a restraint placed on the ground.

Such a restraint may for example take the form of a tube or a plank of wood.

According to an improved variant, the bottom façade element is an anti-crawl element, enabling the animal to pass its hooves below but not its head, and projecting towards the internal space of said stall. In this configuration, the lowest point of the bottom surface of said anti-crawl element is disposed at a height H from the ground. Preferentially, H is between 20 cm and 40 cm.

Thus a particularly preferred subvariant of this improved variant consists of a stall comprising at least one pair of anti-crawl elements (left element or elements and right element or elements) disposed on either side of the stall, preferentially symmetrically, each being fixed to a lateral element such as a stall separator.

In the variants where the anti-crawl elements are disposed on either side of the stall, the horizontal separation D' that separates their respective internal ends (end directed towards the inside of the stall) must be suited to the overall size of the animal, and in particular to its breadth or shoulder width. Preferentially, the separation D' is between 20 cm and 60 cm.

Finally, so that the animal can pass its head between the top and bottom façade element or elements, a sufficient vertical separation H' must exist between them.

Advantageously, in the case where the bottom façade element or elements is or are one or more of the anti-crawl elements, the vertical separation H' is between 40 cm and 70 cm.

Advantageously, the anti-crawl element consists of a horizontal rod.

Preferentially, the anti-crawl element is able to pivot in a vertical plane parallel to the plane $P_1$. For this purpose, it may for example consist of a flexible and/or articulated material.

Finally, it will be understood that a person skilled in the art can choose the characteristics that are most appropriate for said anti-crawl element, according to the animals to be restrained. The anti-crawl element may thus be adjustable (for example in the form of a telescopic rod), and/or flexible, and/or removable, and/or provided with damping elements, and/or articulated.

BRIEF DESCRIPTION OF THE DRAWINGS

Other advantages and features will emerge more clearly from the description of the front elements and of the front structure with reference to the drawings, in which.

DETAILED DESCRIPTION

In the remainder of the text, in each reference pair X-Y, the reference X corresponds to the left-hand element while the reference Y corresponds to the right-hand element.

The minimum geometric reference frame is formed by the vertical plane $P_1$ defining the front of said stall 1, the plane $P_2$ inclined by an angle $\alpha$ relative to the plane $P_1$ and intersecting it on a horizontal axis A and a vertical axis B belonging to $P_1$. Said axis B is an axis passing visually in the middle of the two front elements 10-11 when looking at the front of the stall 1. Optionally, the reference frame may be extended and comprise:

- a vertical plane $P_3$ parallel to the plane $P_1$ and passing through the centre of the restraining means, and
- a vertical axis C belonging simultaneously to the plane $P_3$ and to the plane perpendicular to the plane $P_1$ that contains the axis B.

In each of FIGS. 1 to 4, only the elements of the reference frame most appropriate to good understanding thereof are depicted.

Figure 1:
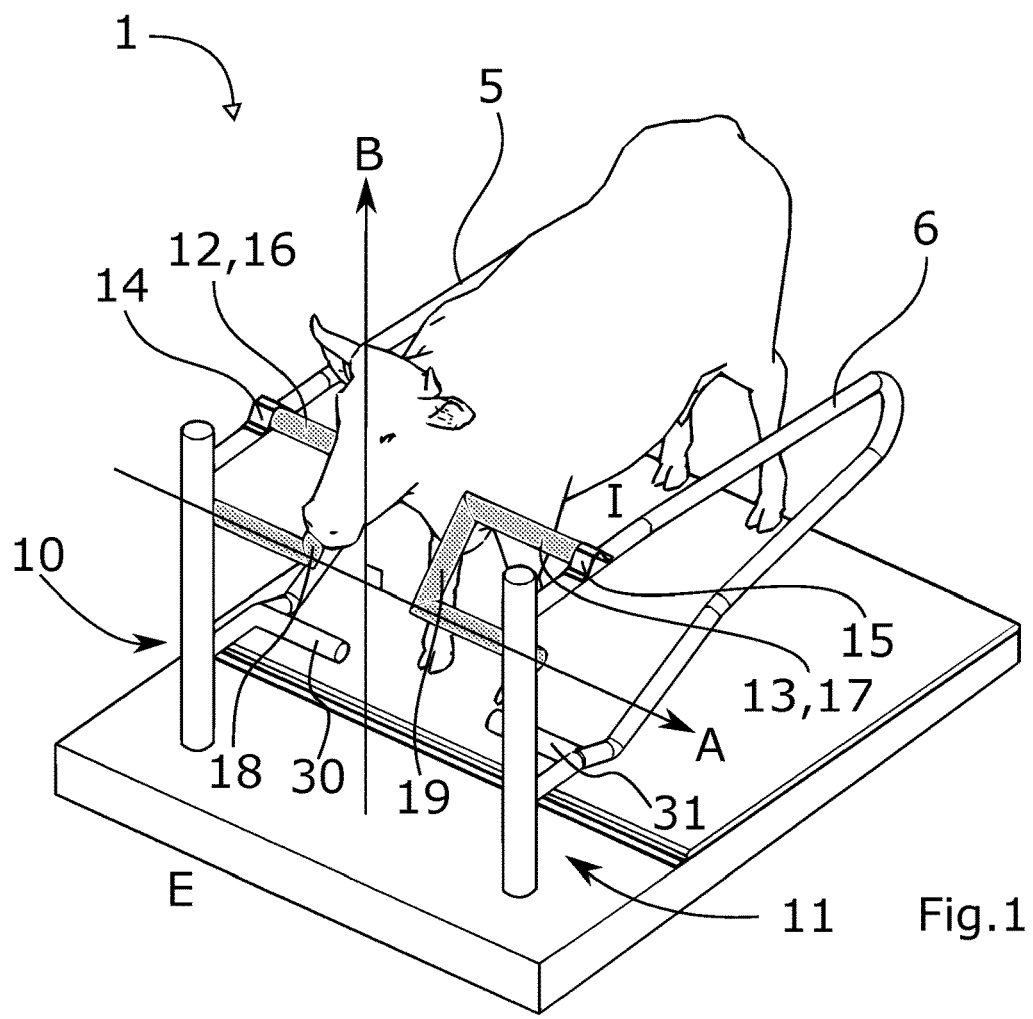
FIG. 1 is a perspective view of a variant of a stall according to the invention.

Advantageously, as presented in FIG. 1, a stall 1 consists of an internal space I and comprises stall separators 5-6 and front elements 10-11, tubular in this variant. The external space E is situated beyond the stall 1, to the front of the animal. Thus the vertical plane $P_1$ delimits the internal space I with respect to the external space E at the front of the stall.

The front elements 10-11 each comprise a means 12-13 for restraining the animal and depicted in grey tint and at least one anchoring means 14-15. Said restraining means 12-13 itself comprises a top rim 16-17 and an inner rim 18-19.

Figure 2:
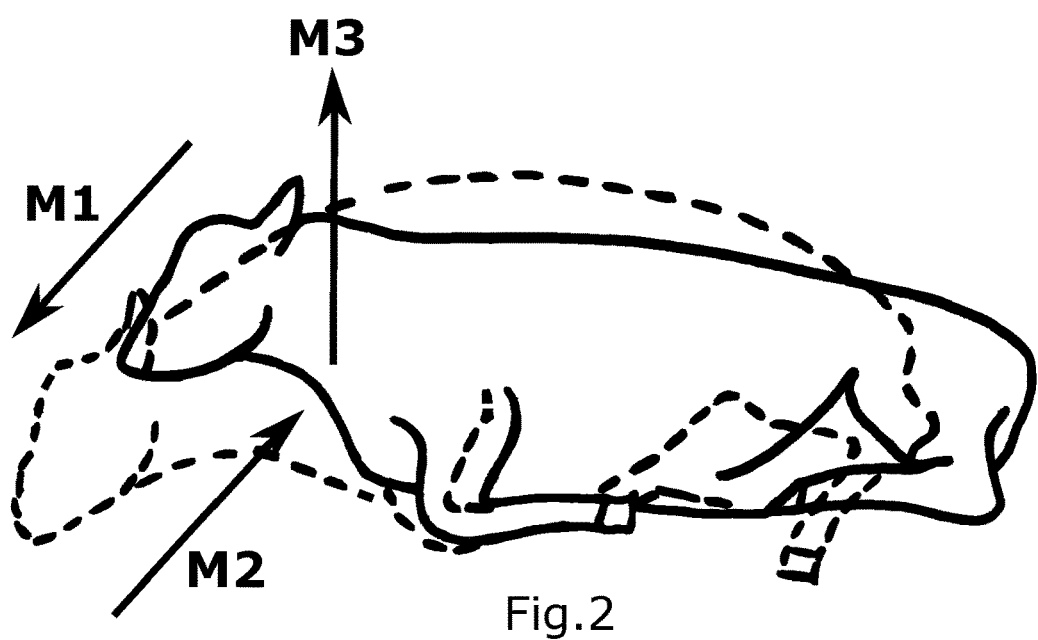
FIGS. 2 and 3 are respectively a side view of the main movements of the animal and a side view of the main positions of the animal in relation to a stall according to the invention.

FIG. 2 is a side view of the main movements of the animal in relation to said stall 1: an animal wishing to stand up, in accordance with FIG. 2, stretches its head forwards and downwards in a movement M1 in order to raise its hindquarters, and then makes a retraction movement M2 both towards the rear and upwards in the course of which its neck is guided by the inner rims 18-19 (the only moment when the inner rims 18-19 are fully opposite the neck of the animal), in order finally to raise itself completely in a vertical movement M3.

Figure 3:
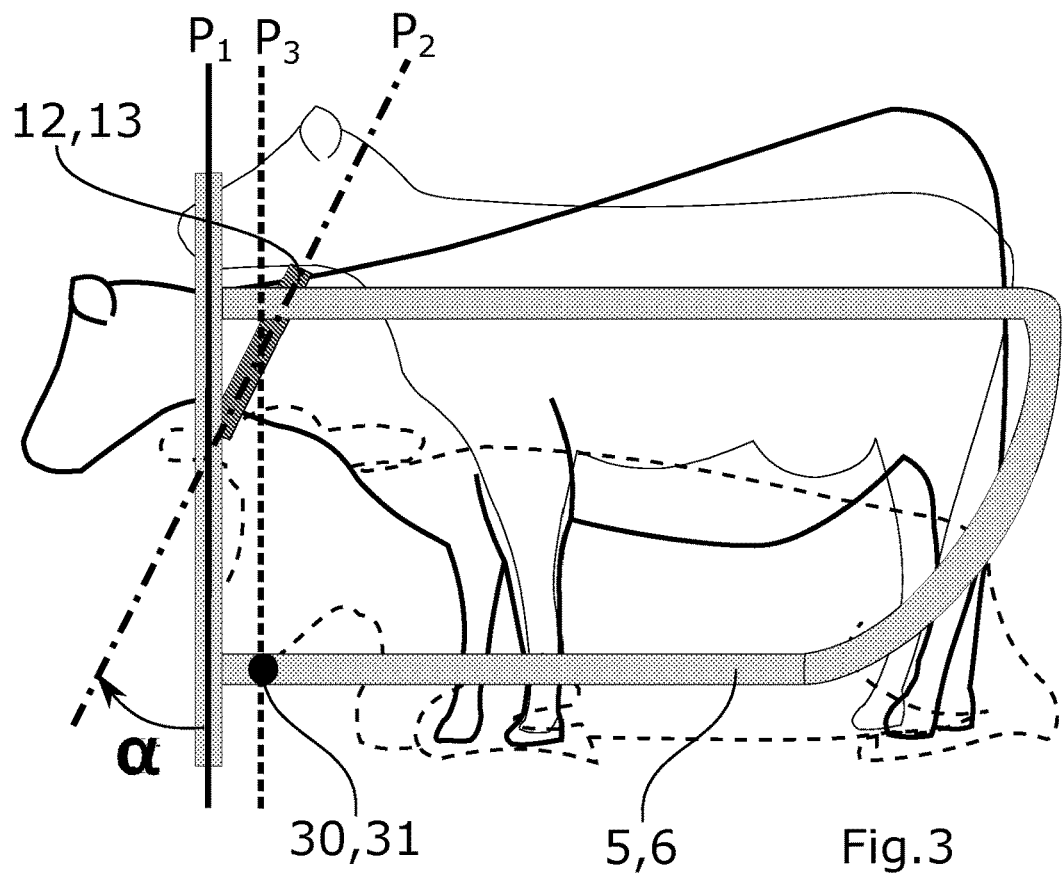

The animal standing (shown in fine solid lines), in the process of lying down (shown in thick lines) and lying down (shown in broken lines) is illustrated in FIG. 3.

When the animal is standing in the stall 1, its head passes freely above the front element 10-11, and more particularly above said top rim 16-17 of said restraining means 12-13, and its shoulders come into abutment with said restraining means 12-13, preferentially at the highest point of said restraining means 12-13.

When the animal is lying in the stall 1, its head may be either below (the case depicted) or above said restraining means 12-13, but whatever the position of its head, the animal cannot pass its shoulders beyond the plane $P_1$ because of the positioning of said restraining means 10-13. Moreover, the anti-crawl elements 30-31 depicted are in the plane $P_3$.

Figure 4:
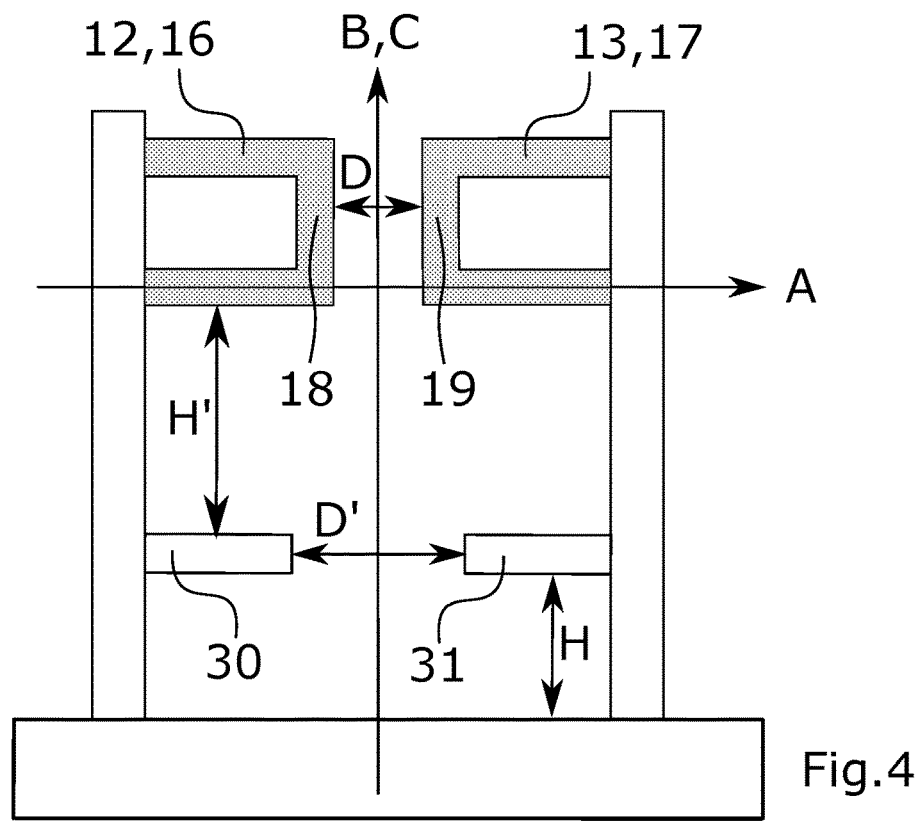
FIG. 4 is a front view of a stall according to the invention.

Finally, FIG. 4 is a front view of said stall 1 and of a part of the associated geometric reference frame. In this figure, the various typical dimensions of said stall 1 are depicted, namely: minimum separation D between said front elements 10-11, horizontal separation D' between the anti-crawl elements 30-31 (the axis C passing visually at the middle of said horizontal separation D' when looking at the front of the stall 1), height H between the ground and the lowest point of said anti-crawl element, vertical separation H' between top and bottom façade element or elements.

In this variant of a stall 1 where said restraining means is rectangular (and with rounded corners), the inner rims 18-19 are parallel, and have a constant minimum separation D.

Nevertheless, in a variant that is not shown, said restraining means 12-13 could for example be triangular, with a separation D between the inner rims 18-19 and decreasing from the highest point of said restraining means towards the lowest point. The minimum separation D would then be measured between the highest points of said restraining means 12-13.

POSSIBILITY OF INDUSTRIAL APPLICATION

It will be understood clearly that the front elements 10-11 and the front structure according to the invention apply to the stalling of animals, and more particularly to bovines, in order firstly to limit the advancement of the animal in its stall 1 and secondly to guide its standing-up and/or lying-down movements, without causing injuries.

Finally, it goes without saying that the present invention is not limited solely to the embodiments described; on the contrary it embraces all variant embodiments and applications complying with the same principle.

The invention claimed is:

1. A front element; for stalling an animal in a stall, the stall having a vertical axis of symmetry B and having a front limit represented symbolically by a vertical plane $P_1$, said plane $P_1$ serving as a boundary between an internal space I of the stall and an external space E of the stall, the front element comprising:

at least one means of restraining the animal, the restraining means including:
a top rim, and an inner rim coupled to the top rim and extending along a plane $P_2$ inclined by an acute angle $\alpha$ in relation to the plane $P_1$, so that a lower portion of plane $P_2$ is directed towards the external space E, the intersection between said plane $P_1$ and said plane $P_2$ defining a horizontal axis A;
wherein the restraining means is:
able to passively guide the movements of the animal when in a movement of getting up or in a movement of lying down,
able to hinder at any time the forward movement of said animal towards the external space E, by forcing the animal at all times to keep its shoulders in the internal space I, and
able to receive the head of the animal above said top rim of said restraining means when the animal is standing, and below said top rim of said restraining means when the animal is in the movement of lying down, such that, when the animal is in the movement of lying down, the shoulders of the animal cannot pass said vertical plane $P_1$ and are oriented along the plane $P_2$.

2. The front element according to claim 1, further comprising at least one anchoring means connected to said restraining means, intended to allow the fixing of said front element to a carrying element.

3. The front element according to claim 1, further comprising at least one deformable means able to attenuate any mechanical force caused by the animal.

4. The front element according to claim 1, further comprising at least one means for adjusting the dimensions of the front element.

5. A front structure for stalling an animal, comprising:
at least two front elements according to claim 1, disposed in a relationship of chiral symmetry in relation to a plane $P_3$ parallel to the plane $P_1$ and passing through the centres of said restraining means, and
a vertical axis C belonging to the plane $P_3$ and belonging to a plane perpendicular to the plane $P_1$ containing the axis of symmetry B;
the two front elements being associated with each other by means of at least one connecting element;
and at least one anchoring means for fixing said front structure to a carrying element;
said front elements having between them a minimum horizontal separation D that is both greater than a neck measurement of the animal and less than a breadth of the animal.

6. A stall for stalling an animal, comprising:
at least one front element according to claim 1, at least one top façade element, and at least one side element.

7. The stall according to claim 6, further comprising at least one bottom façade element.

8. The stall according to claim 7, further comprising at least one anti-crawl element as the bottom façade element, disposed in a plane $P_3$ and projecting towards the internal space I of said stall.

9. The stall according to claim 6, further comprising at least one pair of anti-crawl elements disposed symmetrically on either side of said stall, the respective inner ends of said anti-crawl elements being separated by a horizontal separation D' between 20 cm and 60 cm, and each anti-crawl element being fixed to a side element, and disposed at a height H from the ground between 20 cm and 40 cm, and having a vertical separation H' of between 40 cm and 70 cm with the top façade element disposed above said each anti-crawl element.

\* \* \* \* \*